United States Patent Office
3,565,906
Patented Feb. 23, 1971

3,565,906
(DIACETOXYIODO)- AND [BIS(TRIHALO-
ACETOXY)IODO]PYRIDINES
Zdravko Jezic, Midland, Mich., assignor to The Dow
Chemical Company, Midland, Mich., a corporation of
Delaware
No Drawing. Filed Mar. 3, 1969, Ser. No. 803,946
Int. Cl. C07d 31/34
U.S. Cl. 260—295                                    5 Claims

ABSTRACT OF THE DISCLOSURE (Diacetoxyiodo)pyridines, [bis(trichloroacetoxy) - iodo]pyridines and [bis(trifluoroacetoxy)iodo]pyridines corresponding to the formula

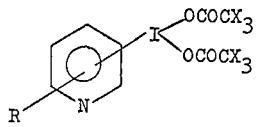

wherein R represents hydrogen, a lower alkyl, an acetamido, a chloro or a bromo group, X represents H, chloro or fluoro and the diacetoxyiodo or bis(trihaloacetoxy)iodo group is in a beta position. They are prepared by reacting an iodosopyridine with glacial acetic, trichloroacetic or trifluoroacetic acid. The compounds are useful as intermediates for the preparation of antimicrobial pyridyliodonium salts.

SUMMARY OF THE INVENTION

The present invention concerns a group of new (diacetoxyiodo)pyridines and [bis(trihaloacetoxy)iodo]pyridines corresponding to the formula

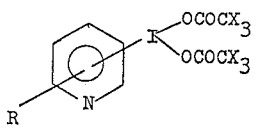

wherein R represents a lower alkyl, an acetamido, a chloro or a bromo group, X represents H, chloro or fluoro and the (diacetoxy)iodo or bis(trihaloacetoxy)iodo group is in a beta position. In the specification and claims, the term "lower alkyl" refers to straight and branched chain alkyl groups containing from 1 to 4 carbon atoms, for example, methyl, ethyl, propyl, isopropyl, n-butyl, isobutyl and t-butyl. The new compounds are crystalline solids which have a low solubility in water, in water-soluble alcohols, in chlorinated hydrocarbons such as methylene chloride, chloroform, methyl chloroform and the like, and a higher solubility in acetic acid. The compounds are useful as intermediates in the preparation of antimicrobial pyridyliodonium salts.

The compounds are prepared by reacting a corresponding iodosopyridine with glacial acetic, trichloroacetic or trifluoroacetic acid according to the following equation:

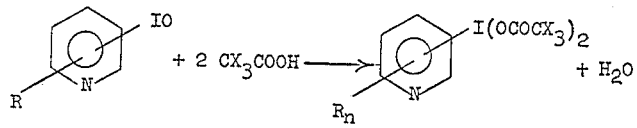

The reaction is advantageously carried out in the presence of acetic acid or trifluoroacetic acid as a solvent reaction medium and in the presence of methylene chloride when trichloroacetic acid is the reactant acid. The amounts of the reactants to be employed are not critical, some of the product being formed when employing any proportions. The reaction consumes the reactants in the ratio of 1 mole of the iodosopyridine compound to 2 moles of the acid, and the employment of such proportions is advantageous. However superior yields are obtained when using up to about ten times the stoichiometric amount or more when acetic acid is the acid reactant, an excess of up to 100 percent when trifluoroacetic acid is the acid reactant and up to 50 percent excess when trichloroacetic acid is the acid reactant. The economics of the process dictates a smaller excess of the more expensive acid reactants. The reaction in each case proceeds at a temperature at which water of reaction is liberated, suitably at a temperature between 0° and 50° C.

In carrying out the reaction, the iodosopyridine and the acid reactant are contacted in any convenient fashion and maintained for a predetermined period of time in the reaction temperature range to complete the reaction. In a representative procedure, the iodosopyridine reactant is added to a well-stirred glacial acetic, trichloroacetic or trifluoroacetic acid. During the addition of the iodosopyridine reactant to the acid and for a period thereafter, the temperature of the reaction mixture is maintained within the reaction temperature range.

Upon completion of the reaction, the desired product is recovered by conventional procedures. To illustrate, excess glacial acetic or trifluoroacetic acid is evaporated under vacuum at a temperature less than 50° C. or may simply be blown off with air at room temperature. Excess trichloroacetic acid in the product is removed by washing with methylene chloride.

The diacetoxyiodo products of this invention may also be prepared economically by reacting a dichloroiodopyridine reactant with lead acetate, according to the following equation:

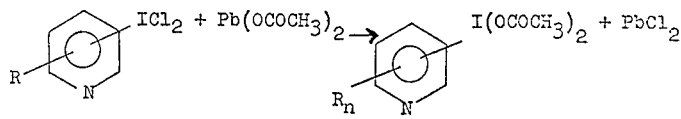

The reaction is advantageously carried out in the presence of a mixture of glacial acetic acid and acetic anhydride as reaction medium. The amounts of the reactants to be employed are not critical, some of the product being formed when employing any proportions. The reaction consumes the reactants in a ratio of 1 mole of the dichloroiodopyridine reactant to 1 mole of the lead acetate, and the employment of such proportions is advantageous. However, superior yields are obtained when a small excess of about 10 percent lead acetate is used. The reaction proceeds at a temperature at which lead chloride is precipitated, suitably at temperatures between 0° and 5° C.

In carrying out the reaction, the dichloroiodopyridine and the lead acetate reagents are contacted in any convenient fashion and maintained for a predetermined period of time in the reaction temperature range to complete the reaction. In an illustrative procedure, the dichloroiodopyridine is suspended in a mixture of glacial acetic acid and acetic anhydride and finely divided solid lead acetate is added thereto with stirring, the acetic anhyride being present to take up the water of crystallization of the lead acetate, which, in the usual commercial form, is present as the trihydrate and represented by the formula $Pb(OAc)_2 \cdot 3H_2O$. During the addition of the lead acetate to the reaction medium and for a period thereafter the temperature of the reaction mixture is maintained within the reaction temperature range.

Upon completion of the reaction, the desired product is separated by usual procedures. In an exemplary operation, the reaction mixture is filtered to remove precipitated lead chloride byproduct, and the filtrate is heated under vacuum to a temperature less than about 50° C. to evaporate off the glacial acetic acid.

DESCRIPTION OF THE PREFERRED EMBODIMENTS

The following examples describe completely representative specific embodiments and the best modes contemplated by the inventor for carrying out the invention.

Example 1.—3-(diacetoxyiodo)pyridine 3-iodosopyridine (6.5 grams, 0.0216 mole) is added with stirring to 25 ml. (0.438 mole) glacial acetic acid.

The resulting hazy solution is stirred for 30 minutes and filtered. The clear solution of the product in glacial acetic acid is blown with air to remove most of the glacial acetic acid, then dried in a vacuum oven at room temperature, ca. 25° C. A slightly off white crystalline solid product having a molecular weight of 323.1 is obtained, melting at 129°–132° C. with decomposition. Infrared analysis is consistent with the named structure.

Example 2.—3-(diacetoxyiodo)-6-methylpyridine 3-dichloroiodo-6-methyl pyridine (24.7 grams, 0.0853 mole) is suspended in glacial acetic acid (180 ml.) and 20 ml. of acetic anhydride, and to the continuously stirred suspension contained in a Morton flask is added $Pb(OAc)_2 \cdot 3H_2O$ (35.6 grams, 0.094 mole) while the reaction temperature is maintained at 0° to 5° C. A white precipitate of lead chloride is gradually formed. After 3½ hours, the precipitate, now denser, is filtered off and washed three times with 20 ml. glacial acetic acid to recover product occluded therein. The filtrate is blown with air to remove most of the glacial acetic acid to yield a semi-solid residue. The latter is dried in vacuo to give a yellowish-white product. The product has a molecular weight of 337.12. Its infrared spectral analysis is consistent with the structure of the product named.

Use of 2-(n-butyl)-5-dichloroiodopyridine in place of the 3-dichloroiodo-6-methylpyridine reactant gives 2-(n-butyl)-5-(diacetoxyiodo)pyridine, having a molecular weight of 379.20.

Example 3.—2-bromo-5-(diacetoxyiodo)pyridine

The procedure of Example 1 is repeated, utilizing 2-bromo-5-iodosopyridine in place of the 3-iodosopyridine reactant. The resulting 2-bromo-5-(diacetoxyiodo)pyridine product has a molecular weight of 402. A substitution of 2-chloro-5-iodosopyridine in place of 3-iodosopyridine similarly gives 2-chloro-5-(diacetoxyiodo)pyridine, molecular weight 357.5.

Example 4.—2-acetamido-5-(diacetoxyiodo)pyridine

The procedure of Example 2 is repeated, substituting 2-acetamido-5-dichloroiodopyridine in place of 3-dichloroiodo-6-methyl pyridine. The product obtained, 2-acetamido-5-diacetoxyiodopyridine, has a molecular weight of 380.15.

Example 5.—5-[bis(trichloroacetoxy)iodo]-2-methylpyridine

A suspension of 2-methyl-5-iodosopyridine (0.1 mole) in 150 ml. methylene chloride is stirred at room temperature and trichloroacetic acid (32.7 grams, 0.2 mole) dissolved in 100 ml. $CH_2Cl_2$ is added dropwise thereto over a period of 15 minutes. The reaction mixture is stirred for an additional 15 minutes, filtered and the clear filtrate is evaporated to dryness by blowing with air. The solid residue is finally dried in a vacuum oven at room temperature. Its molecular weight is 543.81. The infrared spectrum of the product is consistent with the named product.

In like manner, the substitution of an equivalent amount of an unsubstituted or a different lower alkyl, an acetamido, a chloro or a bromo analog of iodosopyridine in place of the 2-methyl-5-iodosopyridine reactant gives analogous [bis(trichloroacetoxy)iodo]pyridines.

Example 6.—3-[bis(trifluoroacetoxy)iodo]pyridine 3-iodosopyridine (22.1 gram, 0.1 mole) is suspended in 250 ml. of methylene chloride, and to the stirred suspension trifluoroacetic acid (23.3 ml., 0.3 mole) is added dropwise over a period of 10 minutes. The reaction mixture is stirred for an additional 20 minutes, filtered and volatiles blown off with air. The solid residue, dried in vacuo, has a molecular weight of 431.04. Its infrared spectrum is consistent with the named structure.

In like manner, the substitution of an equivalent amount of a lower alkyl, an acetamido, a chloro or a bromo analog in place of the iodosopyridine reactant gives analogous [bis(trifluoroacetoxy)iodo]pyridines.

The compounds of this invention are useful as intermediates in the preparation of various antimicrobial 3-pyridyliodonium salts. For example, a 3-pyridyl-2-thienyliodonium trifluoroacetate is prepared by reacting together a 3-(diacetoxyiodo)pyridine or a 3-[bis(trihaloacetoxy)iodo]pyridine with thiophene and trifluoroacetic acid according to the following equation:

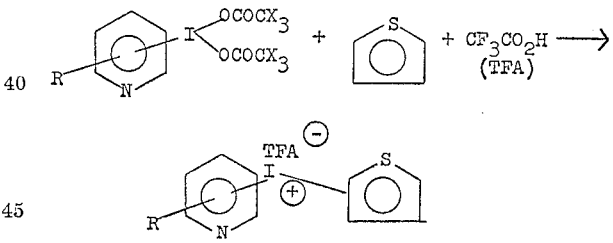

The reaction is preferably carried out in glacial acetic acid or trifluoroacetic acid or a mixture of glacial acetic acid and trifluoroacetic acid as reaction medium. The reaction goes forward when the reagents are employed in any amounts. The reaction consumes the reagents in substantially equimolar amounts and the employment of amounts which represent about equimolar proportions is preferred. The reaction proceeds at temperatures of from about minus 30° to about +20° C. and is preferably carried out at temperatures of from about minus 20° to about +10° C. Upon completion of the reaction, the desired 3-pyridyl-2-thienyliodonium trifluoroacetate is separated by conventional procedures.

In a convenient method of carrying out the reaction, the trifluoroacetic acid and the (diacetoxyiodo)pyridine or [bis(trihaloacetoxy)iodo]pyridine are brought together in the reaction medium and the thiophene reagent is added portionwise thereto with agitation. The reaction is exothermic and goes forward readily with the addition of the thiophene. The temperature of the reaction mixture can be controlled by regulating the rate of addition of the thiophene and by external cooling. The reaction is essentially complete upon completion of the addition of the thiophene. Allowing the resulting mixture to stand for an additional period of time at room temperature assures optimum product yield. Upon completion of the reaction, the reaction mixture is distilled under reduced pressure to remove low boiling constituents. The resulting product usually is further purified, for example, by crystallization from organic solvents such as acetone or ethyl acetate.

The pyridyl-2-thienylodonium chlorides, bromides and chloride hydrochlorides are prepared from the corresponding trifluoroacetates by treatment of said trifluoroacetate with an appropriate gaseous or preferably aqueous hydrogen halide. The amounts of the hydrogen halide reagents to be employed are not critical, some of the desired halides and hydrohalides being obtained when employing the reagents in any proportions. However, the reaction consumes the reagents in proportions of 1 or 2 moles of hydrogen chloride per mole of trifluoroacetate, depending upon whether a chloride or chloride hydrochloride is formed or one mole of hydrogen bromide when the bromide salt is formed, and the use of the reagents in amounts which represent such proportions is preferred. The reaction takes place readily at temperatures of from 0° to 50° C. with the production of the desired pyridyl-2-thienyliodonium chloride, chloride hydrochloride or bromide, respectively, and trifluoroacetic acid of reaction. During the reaction, the halide salts usually precipitate in the reaction mixture as a crystalline solid. Following the reaction, the desired salt product is recovered from the reaction mixture. Usually the product is washed with acetone to remove impurities therefrom and dried at room temperature.

The antimicrobial activity of representative pyridyl-2-thineyliodonium salts derived from the compounds of this invention is shown by 3-pyridyl-2-thienyliodonium chloride hydrochloride and 3-pyridyl-2-thienyliodonium trifluoroacetate. Each of these compounds when employed in aqueous acetone compositions at a concentration of 100 parts per million by weight gives complete control of *Staphylococcus areus, Bacillus subtilis, Salmonella typhosa,* Pseudomonos Sp. Strain 10, Acid fast baterium, and Trichophyton mentagrophytes.

The iodosopyridine and dichloroiodopyridine starting materials from which the products of this invention are prepared can be prepared following procedures published in Ber. 58: 116 (1925) and Ber. 67: 1329 (1934).

What is claimed is:

1. The compound corresponding to the formula

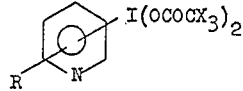

wherein R represents hydrogen, a 1 to 4 carbon alkyl, an acetamido, a chloro or a bromo group, X represents H, Cl or F and the $I(OCOCX_3)_2$ group is in a beta-position.

2. The compound of claim 1 wherein R is 2-chloro and the $I(OCOCX_3)_2$ group is 5-diacetoxyiodo.

3. The compound of claim 1 wherein each of R and X is H.

4. The compound of claim 1 wherein R is 2-acetamido and the $I(OCOCX_3)_2$ group is 5-diacetoxyiodo.

5. The compound of claim 1 wherein R is 2-bromo and the $I(OCOCX_3)_2$ group is 5-diacetoxyiodo.

References Cited

Magidson et al.: Chem. Ber., 58, pp. 113–118 (1925).
Magidson et al.: Chem. Ber. 67, pp. 1329–1331 (1934).

ALAN L. ROTMAN, Primary Examiner

U.S. Cl. X.R.

260—294.8, 295.5, 999